United States Patent

Bolie

[15] 3,644,676

[45] Feb. 22, 1972

[54] MULTICHANNEL SIGNAL NORMALIZER

[72] Inventor: Victor W. Bolie, Stillwater, Okla.

[73] Assignee: Oklahoma State University, Stillwater, Okla.

[22] Filed: Jan. 9, 1970

[21] Appl. No.: 1,810

[52] U.S. Cl. ....................179/15 A

[51] Int. Cl. ....................G10l 1/00

[58] Field of Search ....................179/15 A, 15.55 R; 235/184, 235/185, 193.5, 193

[56] References Cited

UNITED STATES PATENTS 3,360,610 12/1967 Flanagan....................179/15 A 3,423,578 1/1969 Platzer....................235/193.5

*Primary Examiner*—Kathleen H. Claffy

*Assistant Examiner*—Jon Bradford Leaheey

*Attorney*—Head & Johnson

[57] ABSTRACT

An electronic network is comprised of voltage squaring circuits, differential amplifiers, square root circuits, a summing amplifier with input isolation resistors and an adjustable voltage source, interconnected so as to receive at an input terminal strip a set of $n$ parallel and time-varying input signals, collectively identifiable as an input signal vector, and to convert said input signal vector into a set of $n$+1 parallel and time-varying output signals collectively identifiable as an output signal vector, said output signal vector having the property of being of fixed length in its hyperspace of $n$+1 dimensions and also the property of containing all of the information carried in the input signal vector.

1 Claims, 1 Drawing Figure

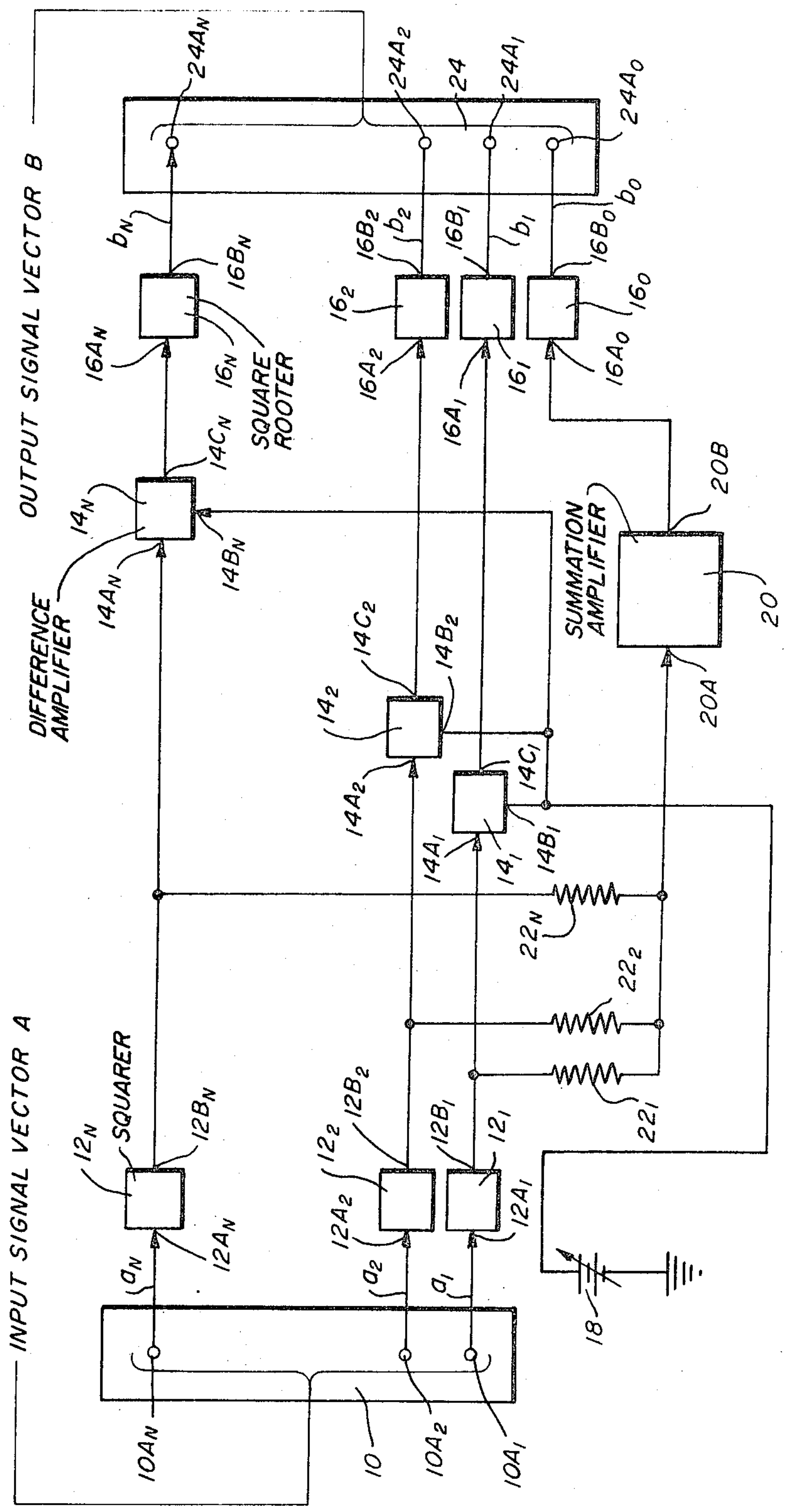
INVENTOR.
VICTOR W. BOLIE
BY
Head & Johnson
ATTORNEYS

MULTICHANNEL SIGNAL NORMALIZER

BACKGROUND AND OBJECTS OF THE INVENTION

This invention relates in general to automatic pattern recognition systems, and in particular to those systems which must operate with a multiplicity of parallel input signal voltages which vary independently or in only partly correlated ways.

To use an example of current engineering interest, in research toward automatic speech-recognition-provisions for verbally instructable control systems, the set of time-varying input signals requiring automatic real-time identification may be the set of appropriately rectified and filtered outputs of a bank of frequency-contiguous band-pass filters driven in parallel by the output of a speech amplifier. Alternatively, the filter bank might in some situations be replaced by a frequency dispersive audio delay line fitted with a distribution of tapped outputs, and arranged to propagate the lowest frequencies with the least attenuation, in analogy with the basilar membrane of the human cochlea. In either case, the multiplicity of parallel signals generated by a particular phoneme, such as the vowel sound "ah," is an example of a particular distribution of voltages comprising a linearly arrayed input signal pattern, which will be identified in general hereinafter as an "input signal vector." Within this context and example, it is evident that, as the signal-generating speech is voiced at normal dictation speed, the input signal vector swings around in both direction and amplitude, thus tracing out a highly convoluted $n$-dimensional geometric structure as time progresses. Similar examples are encountered in multichannel telemetry systems such as those used in unmanned spacecraft.

A central object of the invention to be described herein is to convert any $n$-dimensional variable-length input signal vector into an $n+1$ dimensional fixed-length output signal vector which, by reason of its tip being known to lie on the surface of an $n+1$ dimensional hypersphere, greatly simplifies automatic pattern recognition.

A further object of the invention is to transform or map the tip of a variable length input signal vector onto a fixed-radius hypersphere in such a way that none of the amplitude-carried portion of the original information is lost in the transformation.

Still another object of the invention is to provide novel means for achieving nearly instantaneous automatic gain control for a multiplicity of input signals for various applications.

Other objects and advantages of the invention will become evident from the following description of the invention when taken in conjunction with the attached drawing.

BRIEF DESCRIPTION OF THE DRAWING

The drawing is a block diagram of a circuit network embodying the invention.

DETAILED DESCRIPTION

An input block 10 has a selected number of input terminals 10A through 10A$_N$ for receiving a selected number of time-varying input signals which collectively constitute an input vector signal. For each input terminal 10A there is a voltage-squaring circuit 12, identified as 12$_1$ through 12$_N$ respectively. The design of the voltage-squaring circuits is well known in the art, a commercially available example being Model 4100A-1b-010 Quadratron, manufactured by Bourns, Inc., at Riverside, California. Each of the voltage-squaring circuits includes an input, designated as 12A$_1$ through 12A$_N$ respectively, and an output, designated as 12B$_1$ through 12B$_N$ respectively. The inputs 12A of the voltage-squaring circuits 12 are connected to the input terminals 10A.

For each input terminal 10A there is also a voltage-difference amplifier 14, identified as 14$_1$ through 14$_N$. The design of the voltage-difference amplifier 14 is well known in the art and one commercially available model is the WC115T manufactured by the Molecular Electronics Division of Westinghouse Electric Company of Elkridge, Maryland. Each of the voltage-difference amplifiers includes a first input, designated as 14A$_1$ through 14A$_N$ respectively, a second input, designated as 14B$_1$ through 14B$_N$ respectively, and an output, designated as 14C$_1$ through 14C$_N$ respectively. The first input terminal 14A of each voltage-difference amplifier 14 is connected to the output 12B of a corresponding voltage-squaring circuit 12, that is, input 14A$_1$ is connected to output 12B$_1$ and so forth.

The numeral 16 indicates an analog square root circuit, there being one more analog square root circuit than the total number of input terminals 10A. The analog square root circuits are designated as 16$_0$ through 16$_N$. Such analog square root circuits are well known in the art and are commercially available, such as Model 521/523 by Optical Electronics, Inc., of Tucson, Arizona. Each analog square root circuit has an input, designated as 16A$_0$ through 16A$_N$ respectively, and an output, designated as 16B$_0$ through 16B$_N$ respectively. The inputs of all except one of the analog square root circuits 16 (that is, all except circuit 16$_0$) are connected to the output 14C of a corresponding voltage-difference amplifier. That is, input 16A$_1$ is connected to output 14C$_1$, and so forth.

A voltage source 18 may be of any type of voltage source which dependably maintains a preselected potential with reasonable accuracy. Such preselected potential is applied to the second input 14B of each of the voltage-difference amplifiers 14.

The numeral 20 indicates a current-summing amplifier of design well known in the art and commercially available, such as Model PA223 integrated circuit operational amplifier, manufactured by the Semiconductor Products Department of General Electric Company of Syracuse, New York. The current-summing amplifier has an input 20A and an output 20B. By means of resistors, designated as 22$_1$ through 22$_N$, the output of each of the voltage-squaring circuits 12$_1$ through 12$_N$ is connected to the input 20A of the current-summing amplifier. The output 20B of the summing amplifier 20 is connected to the input 16A$_0$ of the analog square root circuit 16$_0$.

An output block 24 is provided having outlet terminals 24A$_0$ through 24A$_N$, there being one output terminal for each analog square root circuit 16. Input block 10 and output block 24 may not exist physically in the actual embodiment of the invention; that is, input block 10 may be in the form only of the collective inputs 12A$_1$ through 12A$_N$ of voltage-squaring circuits 12$_1$ through 12$_N$, and in like manner output block 24 may exist only as the outputs 16B$_0$ through 16B$_N$ of analog square root circuits 16$_0$ through 16$_N$.

Referring now in particular to the novel aspects of the network illustrated in the drawing, the input signal vector A presented to the set of input terminals 10A$_1$ through 10A$_N$ has its $n$ components represented by individual voltages $a_1$ through $a_N$, which in this example will be assumed nonnegative but variable, and which are, respectively, the inputs to the voltage-squaring circuits 12$_1$ through 12$_N$. The output signal vector B, made available from the set of output terminals 24A$_0$ through 24A$_N$ has its $n+1$ components represented by the individual voltages $b_0$ through $b_N$, which are, respectively, the outputs of the square root circuits 16$_0$ through 16$_N$.

With the exception of 16$_0$, each of the square root circuits is connected to receive its input directly from the output of a corresponding voltage-difference amplifier. The input to analog square root circuit 16$_0$ is the output of the summing amplifier 20 which, with the aid of the array of equal weighting resistances 22$_1$ through 22$_N$, measures the sum of the outputs of the individual voltage-squaring circuits 12$_1$ through 12$_N$.

One of the two inputs to each of the voltage-difference amplifiers 14$_1$ through 14$_N$ is obtained directly from adjustable voltage source 18 which is maintained at a constant potential E selected to be not less than the highest level attained by the square of any of the individual input voltages $a_1$ through $a_N$ comprising the input signal vector A. The second of the two inputs to each of the voltage-difference amplifiers 14$_1$ through 14$_N$ is connected directly to the output of the corresponding one of the voltage-squaring circuits 12$_1$ through 12$_N$.

ANALYSIS OF OPERATION OF THE CIRCUIT

It can be seen that the running variable $b_0$ computed by the part of the network comprised by analog square root circuits 16A$_0$, summing amplifier 20, resistances 22$_1$ through 22$_N$ and voltage-squaring circuits 12$_1$ through 12$_N$ is essentially the "length" of the input signal vector A; i.e.:

$$b_0^2 = \sum_{k=1}^{n} a_k^2$$

It will be also seen that the squared length $c^2$ of the output signal vector B is so comprised that $$c^2 = \sum_{k=0}^{n} b_k^2 = b_0^2 + \sum_{k=1}^{n} b_k^2 = \sum_{k=1}^{n} a_k^2 + \sum_{k=1}^{n} (E - a_k^2) = nE.$$

Thus, the "length" $c$ of the output signal vector B is determined only by setting $E$ of the adjustable voltage source 18A, i.e., $c = \sqrt{nE}$.

The tip of the output signal vector B is therefore constrained to move about over the surface of a hypersphere of radius $c$ in $n+1$ dimensions, regardless of the manner in which the input signal vector A traces out its highly convoluted geometric structure in $n$-dimensions as time progresses. Furthermore, this constraint on the length of the output signal vector is achieved without sacrificing the amplitude-carried portion of the information content of the input signal vector A.

The specific embodiment illustrated in the drawing and described above with frequent reference to time-varying parallel inputs is but one convenient application among many others which may be foreseen from the concept illustrated. For example, the network can easily be converted to receive serial inputs rather than parallel inputs by connecting it to a suitable logic unit controlled by a ring counter to achieve the sequential-read-distributive-write function. As another example, the circuit illustrated can easily be modified to accommodate both positive and negative input voltages by simple biasing of all input signals in the positive direction.

Still another application of the illustrated network is to improve the communication speed of existing radiotelemetry equipment previously limited to communicating binary-coded information at a fixed data rate. The fixed data rate is usually chosen to give a high transmission accuracy during occasions when the most probable signal-to-noise ratio exists in the radio link. The otherwise-wasted information-rate capability which exists during the substantial fraction of time when the signal-to-noise ratio of the radio link is above average can be utilized advantageously by using any desired additional information of lower priority to amplitude-modulate the transmitted binary-coded signal. The illustrated network can then be used at the receiver to make the supplementary information carried in the amplitude modulation separately available from the 24A$_0$ output terminal, and to make available from the remaining output terminals (all $b_k$ for $k \geq 1$) the information originally coded in binary form.

Applications and/or simple modifications of the illustrated network for other useful purposes are apparent in the fields of information processing, data communication, pattern recognition and man-machine interaction. The concept of the invention described above is also useful in digital computer simulation of adaptive systems having signal-interpretation and feature-abstraction capabilities.

It is understood that the invention is not limited to the described specific exemplary embodiment but encompasses the obvious equivalents of each circuit component and each variation of the described circuit.

What is claimed:

1. A multichannel signal normalizer circuit capable of receiving a set of $n$ parallel and time-varying input signals, collectively identifiable as an input signal vector, and converting such input signal vector into a set of $n+1$ parallel and time-varying output signals, collectively identifiable as an output signal vector, having the property of being of fixed length in its hyperspace of $n+1$ dimensions and also having the property of containing all of the information carried in the input signal vector, the circuit comprising:

an input block having a selected number of input terminals for receiving a selected number of parallel time-varying input signals collectively constituting an input vector signal;

a plurality of voltage-squaring circuits, there being one voltage-squaring circuit for each input terminal of said input block, each of said voltage-squaring circuits having an input and an output, the input of each being connected to a different input terminal;

a plurality of voltage-difference amplifiers, there being one voltage-difference amplifier for each of said input terminals and, correspondingly, one for each of said voltage-squaring circuits, each of said voltage-difference amplifiers having a first input, a second input and an output, the first input of each voltage-difference amplifier being connected to the output of a corresponding voltage-squaring circuit;

a selectably variable constant voltage source, the second input terminal of each of said voltage-difference amplifiers being connected to said constant voltage source;

a current-summing amplifier having an input terminal and an output terminal;

a resistor between the output of each of said voltage-squaring circuits and the input of said current-summing amplifier whereby the said current-summing amplifier measures the sum of the outputs of said individual voltage-squaring circuits;

a plurality of analog square root circuits each having an input and an output, the number of analog square root circuits being equal to the number of voltage-difference amplifiers plus one, the output of each said voltage-difference amplifier being connected to the input of an analog square root circuit and the output of said current-summing amplifier being connected to the input of one of said analog square root circuits; and an output block having a number of output terminals equal to the number of input block terminals plus one, each of said analog square root circuit outputs being connected to an output block terminal, the output block terminals collectively providing an output signal vector.

* * * * *